Aug. 10, 1937.  J. ROSENQUIST  2,089,576
SAFETYPIN
Filed Feb. 17, 1936
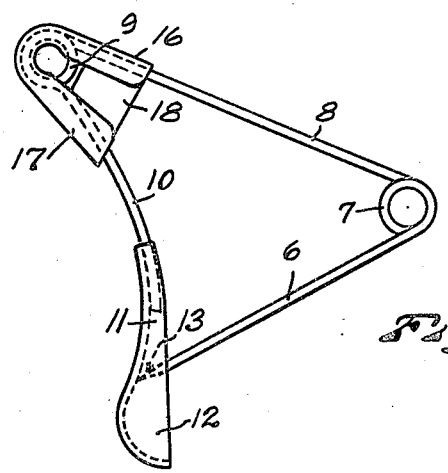
Fig. 1
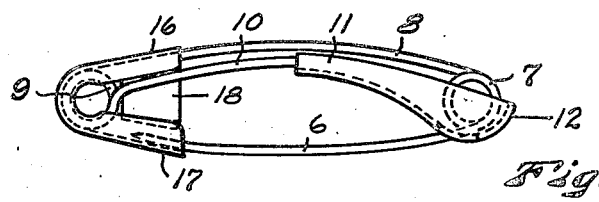
Fig. 2
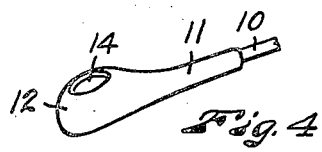
Fig. 4
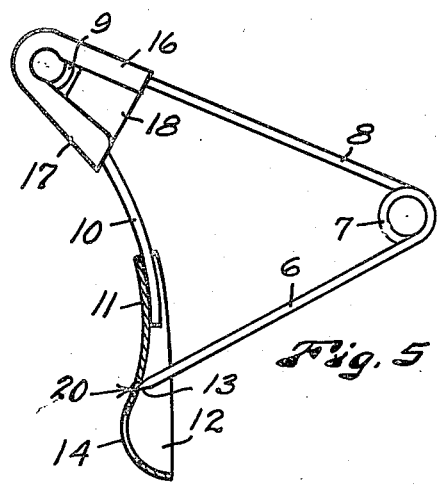
Fig. 3
Fig. 5
INVENTOR.
John Rosenquist
BY
Fred C. Matheny
ATTORNEY Patented Aug. 10, 1937

2,089,576

UNITED STATES PATENT OFFICE 2,089,576

SAFETYPIN

John Rosenquist, Seattle, Wash.

Application February 17, 1936, Serial No. 64,228

5 Claims. (Cl. 24—156)

This invention relates to safety pins and the primary object of this invention is to provide a safety pin having a guard means protecting the point thereof in such a manner as to prevent a child from swallowing the safety pin.

Another object is to provide a safety pin having a guard means which protects the point of the pin in such a manner as to reduce the danger of a person injuring their fingers on the point of the pin when the pin is in an open position.

Another object of this invention is to provide a safety pin having a guard means of spring metal which augments the usual spring action of the safety pin and tends to open the safety pin when it is unclasped.

Other and more specific objects of the invention will be apparent from the following description taken in connection with the accompanying drawing.

In the drawing Figure 1 is an elevation of a safety pin constructed in accordance with this invention showing the same in an open position.

Fig. 2 is a side elevation of the same showing the safety pin in closed position.

Fig. 3 is an elevation, in open position, of the spring wire portion of this safety pin with a part of the guard member shown in section and the keeper for the pin point omitted.

Fig. 4 is a fragmentary perspective view of a portion of the guard member.

Fig. 5 is side elevation with parts of the guard in section, of a modified form of safety pin shown in open position.

Like reference numerals designate like parts throughout the several views.

The drawing shows a safety pin preferably formed of a single piece of spring wire shaped to provide a pin portion 6, a spring loop 7, a back portion 8, another spring loop 9, and a guard portion 10. The parts 6, 7 and 8 are substantially the same as like parts of an ordinary safety pin. The parts 9 and 10 are made in accordance with this invention and form a part of the guard mechanism. A sheet metal guard member 11 is fixedly secured to the guard wire 10. This guard member 11 is of trough like cross section with an enlarged end portion 12 and is adapted to receive the sharpened point 13 of the pin portion 6. The enlarged portion 12 is provided with an opening 14 through which the pin portion 6 extends and moves as the safety pin is closed and opened. The enlarged portion 12 fits over the spring loop 7 when the safety pin is in closed position. The bottom of the trough like guard member, at the location where it is engaged by the pin point 13 when the safety pin is in open position, is inclined as more clearly shown in Fig. 3, so that the pin point will slide within said trough like portion when pressure is exerted tending to move the guard member toward a closed position.

The enlarged portion 12 of the guard member fits over the loop portion 7 when the safety pin is closed and the portions 10 and 11 of the guard member are curved, as shown, so that they will lie close to the back portion 8 of the safety pin and afford ample room within the safety pin for gathered cloth when the pin is inserted through cloth or like material and closed. The back portion 8 assumes a substantial curvature when the safety pin is closed.

A keeper member 16 similar to that used on the conventional safety pin is provided at the location of the loop 9. This keeper member 16 is preferably secured to the back portion 8 and has a U shaped portion 17 receiving the end of the pin portion 6 when said pin portion is in closed position. A partition member 18 preferably extends from the part of the keeper, which is secured to the back portion 8, outwardly into the U shaped keeper portion 17. When the safety pin is in open position the guard wire portion 10 is positioned in the U shaped keeper portion 17 and the keeper portion 17 acts as a stop limiting the outward movement of the guard member 10—11. When the safety pin is closed the guard wire 10 is moved out of the U shaped keeper portion 17 and lies close to the back portion 8 as shown in Fig. 2, so that it is possible to engage the pin portion 6 within the keeper 17 from either side without interference from the guard wire 10.

In inserting this safety pin in a piece of cloth the enlarged portion 12 of the guard member is placed against the cloth at the location where the pin is to be inserted and a pressure is exerted in a proper direction to move the sharpened end of the pin toward the cloth. This pressure will cause the sharpened end of the pin 6 to move outwardly along the bottom of the trough shaped guard member 11 until it registers with and projects through the opening 14, whereupon, further movement of the pin 6 will cause it to be thrust into the cloth and will cause the guard portion 11 to be moved along the pin portion 6 toward the loop 7. When the pin 6 is closed and engaged within the keeper 17 the guard portions 10 and 11 will be moved into the position shown in Fig. 2, allowing ample room for the cloth within the pin. The spring loop 9 always urges the guard parts 10 and 11 out into the position shown in Figs. 1 and 3. When the pin is unclasped from a piece of cloth these guard parts exert an outward pressure on the cloth and help to push such cloth off of the pin 6, thus assisting in unfastening the safety pin. The spring force exerted by the guard parts 9 and 10 and 11 further tends to force the pin 6 outwardly beyond the position it would normally tend to assume when unclasped, thus causing the point 13 of said pin always to be held closely against the bottom of the trough like guard member when the pin is unclasped. This spring force pressing the pin point 13 into the trough like guard member 11 normally prevents the point 13 from being displaced from said guard member into an exposed position.

When this safety pin is unclasped it will always assume the completely open position shown in Fig. 1. In this completely open position the safety pin will be of substantially triangular shape and it will be substantially impossible for a child to swallow one of these open safety pins. The guard part 10 always holds the pin wide open when it is unclasped and always protects the point of the same except when a pressure is exerted forcing the pin through the opening 14.

In Fig. 5 I have shown a modified form of safety pin in which all parts are substantially the same as the corresponding parts of the previously described safety pin except that a recess 20 is provided in the guard member for receiving the point of the pin when the pin is in the unclasped or open position. When the point of the pin is in this recess 20 it is impossible to force said point of said pin through the opening in the guard member by pressure without first displacing the point of the pin from the recess 20. In this manner I provide a pin in which the point is shielded in such a manner as to prevent exposure of said point and accidental injury to the hands due to grasping or squeezing said safety pin. The pin shown in Fig. 5 is not as easily inserted into a piece of cloth as is the pin shown in Figs. 1 to 4 because, with the pin shown in Fig. 5 it is necessary to displace the point from the recess 20 before the pin can be inserted into a piece of cloth. Obviously an obstruction or shoulder of any kind in the bottom of the trough shaped guard will function in substantially the same way as the recess 20 in providing a locking means for the point of the pin.

The foregoing description and accompanying drawing clearly disclose a preferred embodiment of my invention but it will be understood that this disclosure is merely illustrative and that changes may be made within the scope and spirit of the following claims.

I claim:

1. The combination with a safety pin having the usual pin portion and back portion and keeper portion, of a resilient guard member slidable throughout substantially the length of the pin portion extending from the keeper portion to the point of the pin portion when the safety pin is in open position.

2. The combination with a safety pin having the usual pin portion and back portion and keeper portion, of a resilient arm connected with the keeper portion; and a guard member of trough like cross section secured to the outer end of said resilient arm and positioned to receive the point of the pin portion, said guard member having an opening through which the pin portion may protrude as the safety pin is closed.

3. The combination with a safety pin having the usual pin portion and back portion and keeper portion, of a resilient arm connected with the keeper portion; and a guard member of trough like cross section secured to the outer end of said resilient arm and positioned to receive the point of the pin portion, the outer end of said guard portion being enlarged and having an opening therein which is slidable over the pin portion as the pin portion is moved between an open and a closed position.

4. In a safety pin, a one piece resilient wire comprising a pin portion, a spring loop at one end of said pin portion, a back portion connected with said spring loop and extending outwardly therefrom, another spring loop connected with the other end of said back portion, a guard arm connected with said last mentioned loop and extending outwardly therefrom toward the point of said pin portion; a keeper secured to said safety pin at the location of said last mentioned spring loop and adapted to receive the point of said pin portion when the safety pin is closed; and a trough like guard member secured to said guard arm and positioned to receive the point of said pin portion when the safety pin is in open position, said guard member having an opening and being positioned at an angle relative to said pin point whereby pressure on the outer side of said guard member will move said pin point along said guard member and project said pin point out through the opening in said guard member.

5. In a safety pin, a back portion; a keeper portion at one end of the back portion; a pin portion resiliently connected with the other end of the back portion, said pin portion having a point fitting within the keeper portion when said pin portion is in closed position and said pin portion being movable away from said back portion substantially in the plane of the safety pin into an open position; and a resilient guard portion connected with said keeper portion and slidable on said pin portion and extending substantially from said keeper portion to the point of said pin portion when said pin portion is in an open position.

JOHN ROSENQUIST.